(12) United States Patent
DeSmitt et al.

(10) Patent No.: US 7,069,747 B2
(45) Date of Patent: Jul. 4, 2006

(54) MIRROR BLANKS FROM INFLATABLE BALLS

(75) Inventors: Steven M. DeSmitt, Fairport, NY (US); David N. Strafford, Pittsford, NY (US); Joseph R. West, Webster, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 501 days.

(21) Appl. No.: 10/328,524

(22) Filed: Dec. 23, 2002

(65) Prior Publication Data

US 2004/0121193 A1 Jun. 24, 2004

(51) Int. Cl.
*C03B 23/00* (2006.01)

(52) U.S. Cl. .............. 65/21.4; 65/34; 65/36; 65/41; 65/56; 65/58

(58) Field of Classification Search ............. 65/21.4, 65/34, 36, 41, 56, 58
See application file for complete search history.

(56) References Cited

U.S. PATENT DOCUMENTS

| | | | | |
|---|---|---|---|---|
| 2,316,749 A | * | 4/1943 | Powers | 65/22 |
| 2,537,465 A | * | 1/1951 | Jobling-Purser et al. | 65/38 |
| 3,535,098 A | * | 10/1970 | Babcock | 65/33.5 |
| 3,607,169 A | * | 9/1971 | Coxe | 65/21.4 |
| 3,713,728 A | | 1/1973 | Austin et al. | |
| 4,364,763 A | * | 12/1982 | Rennerfelt | 65/22 |
| 4,606,960 A | * | 8/1986 | Angel et al. | 428/116 |
| 4,670,338 A | | 6/1987 | Clemino | |
| 4,917,934 A | | 4/1990 | Sempolinski | |
| 5,208,704 A | | 5/1993 | Zito | |
| 5,316,564 A | | 5/1994 | Nakamura et al. | |
| 5,640,282 A | | 6/1997 | Ise et al. | |
| 5,713,974 A | * | 2/1998 | Martin et al. | 65/17.2 |
| 6,045,231 A | | 4/2000 | Martineau | |
| 6,176,588 B1 | | 1/2001 | Davis, Jr. et al. | |

FOREIGN PATENT DOCUMENTS

SU 739458 6/1980

OTHER PUBLICATIONS web site: www.kodak.com, "Low-Temperature Fusion Welding", Dec. 2002.

* cited by examiner

*Primary Examiner*—Sean Vincent
(74) *Attorney, Agent, or Firm*—RatnerPrestia

(57) ABSTRACT

A method for constructing a mirror blank, including arranging hollow glass balls, on a front face sheet, and in close proximity to each other to permit fusing upon expansion; restricting the expansion of the hollow glass balls with a bounding structure during expansion of the hollow glass balls to force the hollow glass balls into a densely packed array of cells; applying heat to soften the hollow glass balls and increase the pressure within the hollow glass balls as the hollow glass balls fuse with each other during expansion, forming cells, wherein as a result of fusing, the hollow glass balls contact the front face sheet as a result of the increased pressure within the hollow glass balls; annealing and cooling the mirror blank to below annealing temperature associated with the hollow glass balls; and venting the cells.

27 Claims, 7 Drawing Sheets

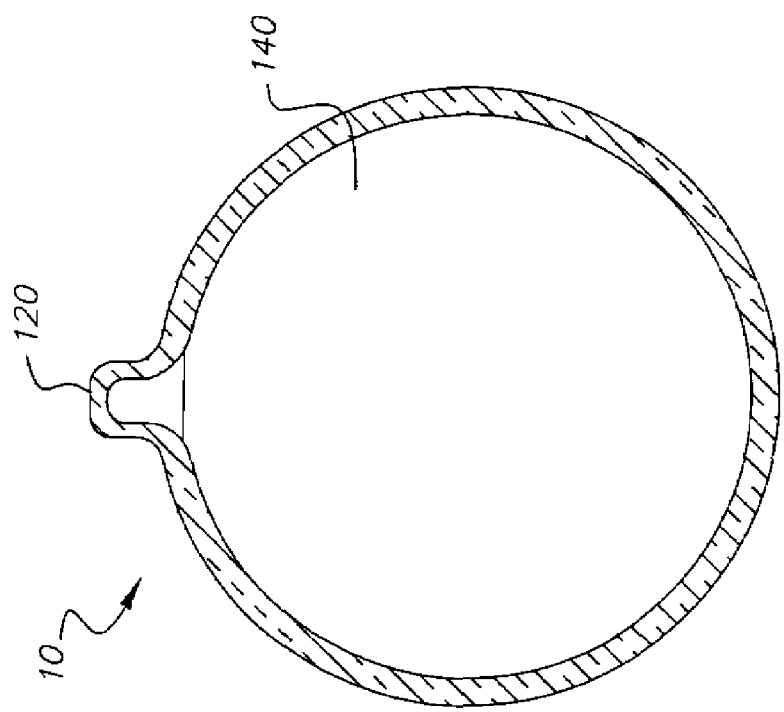
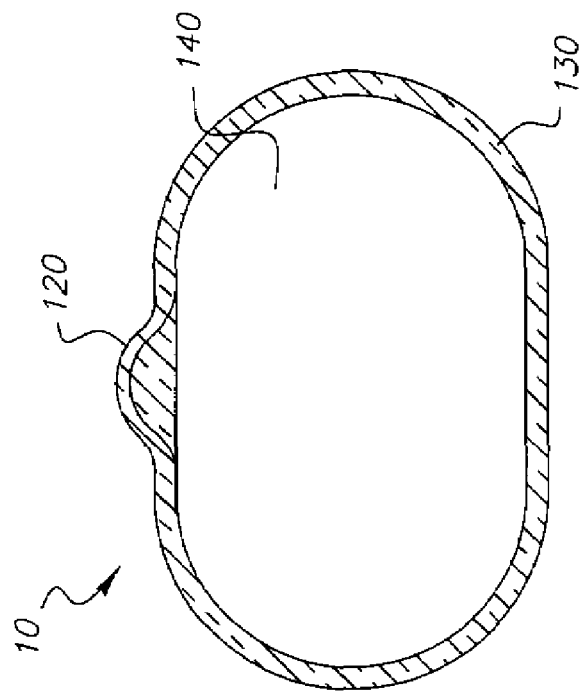
FIG. 6A
FIG. 6B

MIRROR BLANKS FROM INFLATABLE BALLS

This invention was reduced to practice with Government support under contract 02-C-0390, CLIN 0002, awarded by the National Reconnaissance Office. The Government has certain rights in this invention.

FIELD OF THE INVENTION

The invention relates generally to the field of lightweight mirrors and precision optics; and in particular to fabricating lightweight mirror blanks that are thermally, mechanically, and environmentally stable. More specifically, the invention relates to a mirror blank fabrication process that involves inflating hollow glass balls in a densely packed array and producing hexagonal cells.

BACKGROUND OF THE INVENTION

The need for better astronomical and ground based telescope resolution has driven the manufacturing of larger diameters of primary mirrors of such telescopes. However, larger diameter primary mirrors result in the primary mirrors having additional weight and manufacturing problems. For example, because large solid mirror blanks weigh more, they require more time to cast and to anneal. The heavier mirror blanks also bend under their own weight, and are more difficult to maneuver in the factory.

In contrast, lightweight mirrors, fabricated from lightweight mirror blanks, have the advantage of increasing the frequency of the first resonant mode. Light weighting mirror blanks, as it is termed in the industry by those skilled in the art, make the mirror assembly more tolerant of spacecraft maneuvers, as well as increasing the mirror's stability. Lightweight mirrors also result in lighter payloads and lower booster rocket power requirements.

Different inventors have suggested various methods of light weighting mirror blanks. One approach takes a high quality front plate and attaches it to a foam core. For mechanical stiffness, a back plate was usually added to the rear of the foam core. U.S. Pat. No. 4,670,338 issued Jun. 2, 1987 to Alain Clemino and titled "Mirror Foamed Glass Substrate And Method Of Manufacture" discloses a series of foamed blocks glued together and then attached to face sheets. In U.S. Pat. No. 5,208,704 issued May 4, 1993 to Richard R. Zito and titled "Ultralight Mirrors," a fibrous substrate made from silica and alumina fibers was sealed and subsequently coated with a slurry glaze. The coefficients of thermal expansion (CTE's) were matched to prevent warping. Tatsumasa Nakamura, et al. disclose in U.S. Pat. No. 5,316,564 issued May 31, 1994, and titled "Method For Preparing The Base Body Of A Reflecting Mirror," a process to fuse a thin plate to foamed silica using a silicon-rubber curing agent. Nakamura, et al. also disclosed fusing the thin plate using fine glass powder. In U.S. Pat. No. 5,640,282 issued Jun. 17, 1997 to Yoshiaki Ise, et al., and titled "Base Body Of Reflecting Mirror And Method For Preparing The Same," the inventors disclose attaching a high-quality plate to a porous substrate using silica powders. Claude L. Davis, Jr., et al. (U.S. Pat. No. 6,176,588, issued Jan. 23, 2001, and titled "Low Cost Light Weight Mirror Blank") show an optical surface attached to extruded ceramic honeycomb (e.g., Corning's CELCOR®) with room temperature vulcanizing silicon. These approaches all use adhesives that have slightly different CTE's. Also, the bonding materials are hydroscopic and can change dimensions with humidity.

A second approach is described in U.S. Pat. No. 3,713,728, issued Jan. 30, 1973 to Lewis M. Austin, et al.; whereby molten glass is poured around small refractories. The refractories (e.g., Glasrock Foam No. 25) were supported by pins. Later, the refractories were removed. This process resulted in a dimensionally stable mirror blank, however, the degree of light weighting with this process is limited.

In a third approach, a core structure is built up from thin struts and face sheets are attached to the strut structure. U.S. Pat. No. 4,917,934, issued Apr. 17, 1990 to Daniel R. Sempolinski, and titled "Telescope Mirror Blank And Method Of Production" discloses a strut assembly with frit bonding and then bonds the assembly to face plates with frit bondings or tape cast strips. These frit bonds are subject to moisture absorption. Also, struts tend to sag when heated, unless the struts are thick. Thick struts will limit the degree of possible lightweighting. Phillip R. Martineau, in U.S. Pat. No. 6,045,231, issued Apr. 4, 2000, and titled "Open Core Light-Weight Telescope Mirror And Method Of Manufacture" disclosed front and back plates fused to a strut structure by fusing the plates at the softening point. The strut structure is open to the outside diameter, eliminating the need for vent holes. Concerns remain that this design suffers from stability problems especially when the optic is mounted in a trunion or tip/tilt mount.

The Hextek Company has successfully made mirrors using their GAS-FUSION® process. In this process, borosilicate glass tubes are pressurized while the tubes are heated between face sheets. The tubes are pressed into a hexagonal close-pack geometry. The temperature is reduced and the pressure is reduced. The result is an 85% light-weight core. While this process yields a structurally sound blank, the industry is now demanding still lighter mirrors. The degree of light-weight is limited by the cells supplying enough structural support after heating and before inflating. Cells too thin will sag after heating.

Russian Patent No. 739458 from Derevensky, et. al. shows closed tubes with spherical bulges. The inventors disclose arranging the tubes such that the spherical regions are in a close-packed orientation, however, the tube arrangement is not maximally dense. The parts are fabricated from sealed tubes. Regions along each tube are heated and blown. Each tube needs to be a custom length and while there may be sets of equal lengths, tubes cannot be fabricated until the overall mirror blank dimensions are known.

Located on the Internet at www.kodak.com, Eastman Kodak Company combined the core structure approach with a low temperature fusion (LTF) process to make several mirrors. The core structure is cut from a solid blank using an abrasive water jet (AWJ) tool. The face sheets are fused to the polished core structure and a back plate is added. However, the LTF process may still be improved upon to reduce manufacturing time and process costs.

In these aforementioned mirror blank fabrication processes, a supplier requires custom tooling and significant time to build the mirror blank to specification. The costs for tooling, material, and process steps can be prohibitive.

SUMMARY OF THE INVENTION

The present invention is directed to overcoming one or more of the problems set forth above by providing a method for constructing a mirror blank assembly, including arranging hollow glass balls, on a front face sheet, and in close proximity to each other to permit fusing upon expansion; restricting the expansion of the hollow glass balls with a bounding structure during expansion of the hollow glass balls to force the hollow glass balls into a densely packed array of cells; applying heat to soften the hollow glass balls and increase pressure within the hollow glass balls as the hollow glass balls fuse with each other during expansion, forming cells, wherein as a result of fusing, the hollow glass balls contact the front face sheet as a result of the increased pressure within the hollow glass balls; annealing and cooling the mirror blank assembly to below annealing temperature associated with the hollow glass balls; venting the cells to equalize internal and external pressure applied to the front face sheet; and keeping the cells vented in the mirror blank assembly.

ADVANTAGES

The present invention also has the following advantages:

Only the material required for the mirror blank is used. In contrast, one conventional process removes more than 95% of the glass from a solid blank, leaving a cell or strut structure.

Since smaller components are used to fabricate mirror blank, the annealing times are shorter.

Since the components are common to several mirror shapes, components can be fabricated ahead of time thereby reducing the time required for mirror blank fabrication.

The components are simple shapes that lend themselves to an automated fabrication process.

This process is capable of producing mirror blanks and mirrors whose areal densities are less than 10 kg/m$^2$.

The mirror blank fabrication process can be part of near net shape face sheet slumping process where the face sheet and blank are generated at the same time.

This process does not use any adhesives, bonding layers, or silica powders and is constructed from only one material.

This process is not subject to moisture absorption or adsorption problems.

The resulting core cells are mechanically very strong, stable, and stiff.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIGS. 6A and 6B show typical ball geometries;

To facilitate understanding, identical reference numerals have been used, where possible, to designate identical elements that are common to the figures.

DETAILED DESCRIPTION OF THE INVENTION

An improved method for fabricating low cost, short fabrication time, and lightweight mirror blanks is provided. The present invention provides lightweight mirror blanks with areal densities below 15 kg/m$^2$, with a variety of geometric shapes, in shorter fabrication times, and reduced fabrication costs.

Figure 1:
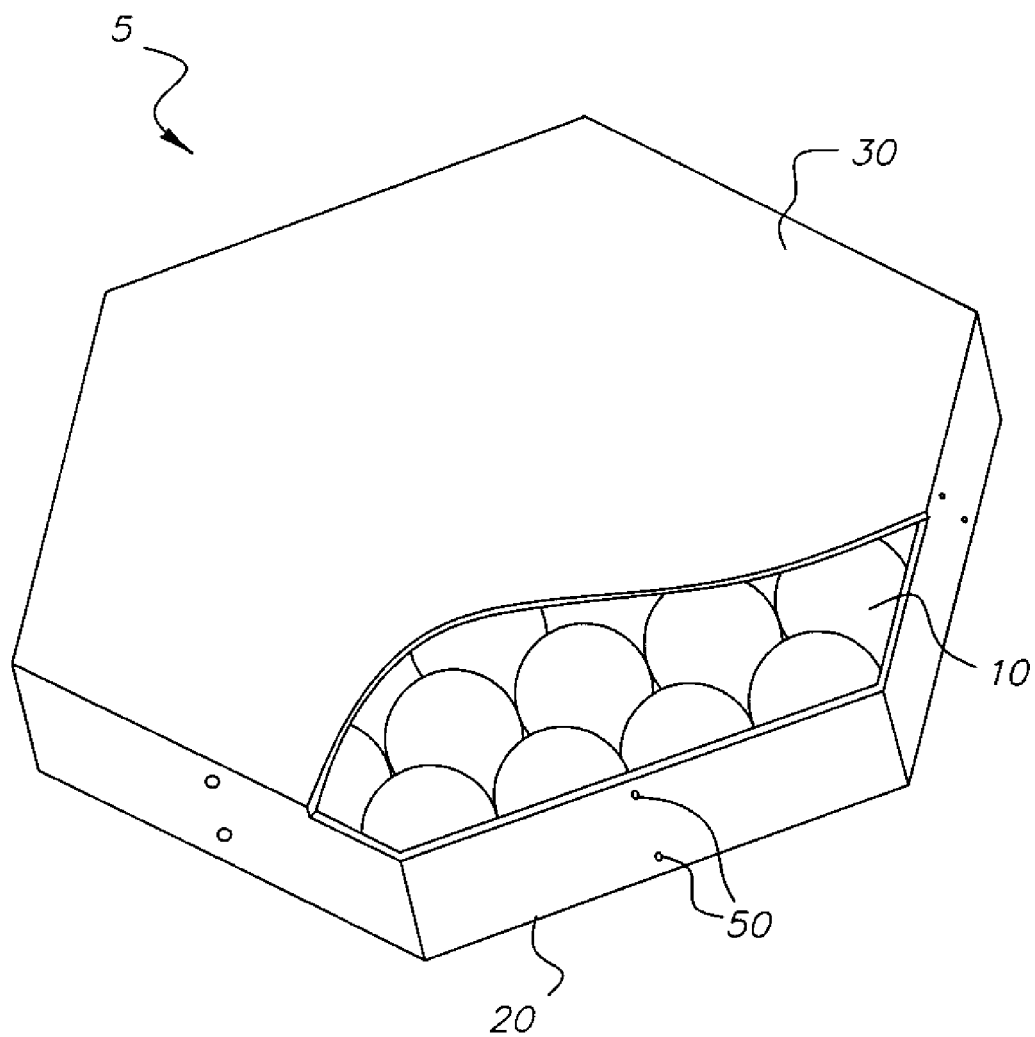
FIG. 1 is a perspective view of a mirror blank before the balls are inflated.

FIG. 1 shows a pre-inflated hexagonal close-packed mirror blank 5. The mirror blank 5 includes an array of substantially spherical hollow glass balls 10 arranged in a dense-packing. The hollow glass balls 10 are arranged in close proximity to each other to permit fusing when they are heated and subsequently expand. Thin-shelled, hollow-glass balls 10 are approximately round in one embodiment, but could be oblate, pear shaped, flat bottomed, or distorted in other ways. Typically, the hollow glass balls 10 will be sealed resulting in an artifact on the hollow glass ball 10 where the glass has melted an orifice closed. The hollow glass balls 10, albeit not perfectly spherical and with substantially the same diameter, are arranged so that non-border balls all contact six other balls. The hollow glass balls 10 are also thin shelled. This orientation provides a maximally dense arrangement and symmetry. Close packing also insures good fusion between balls and helps make fused cells a regular hexagonal close pack. The close packing also minimizes the distance between the centers of the hollow glass balls 10. In addition, close packing minimizes quilting on front and back face sheets 20 and 30, respectively, while symmetrically supporting the front and back face sheets 20, 30. For this geometry, the mathematician, Gauss, proved the densest packing array is a hexagonal lattice. For precision optical blanks, this geometry is generally preferred over the circle and sphere packing concepts.

Figure 5A:
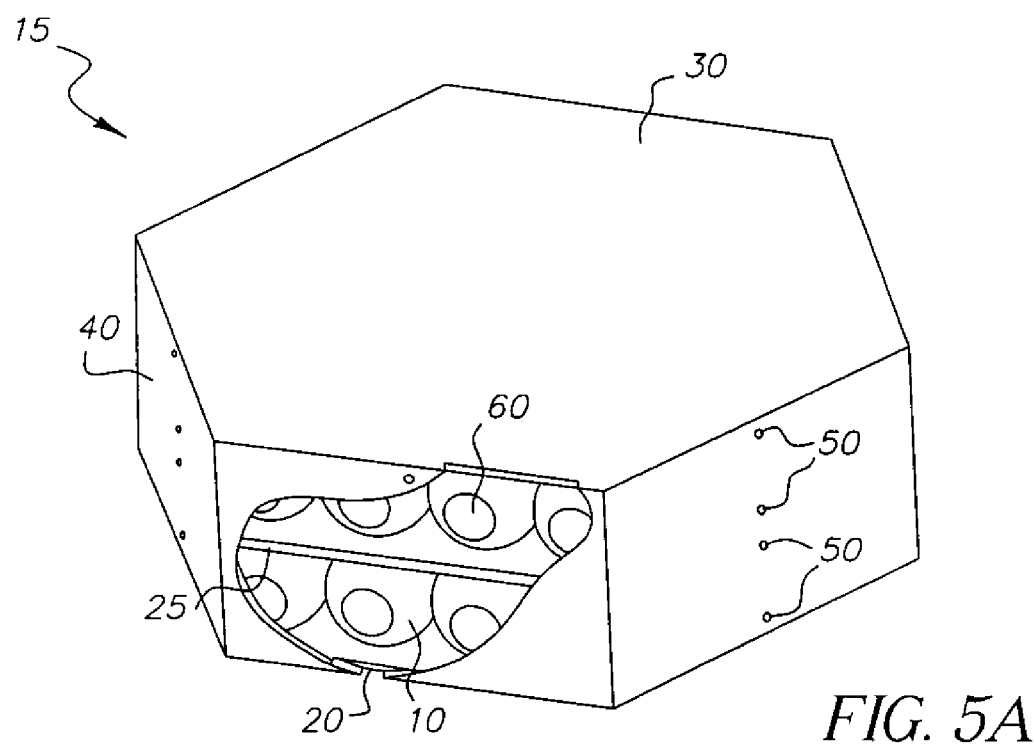
FIG. 5A illustrates that the blank may have more than one layer.
Figure 5B:
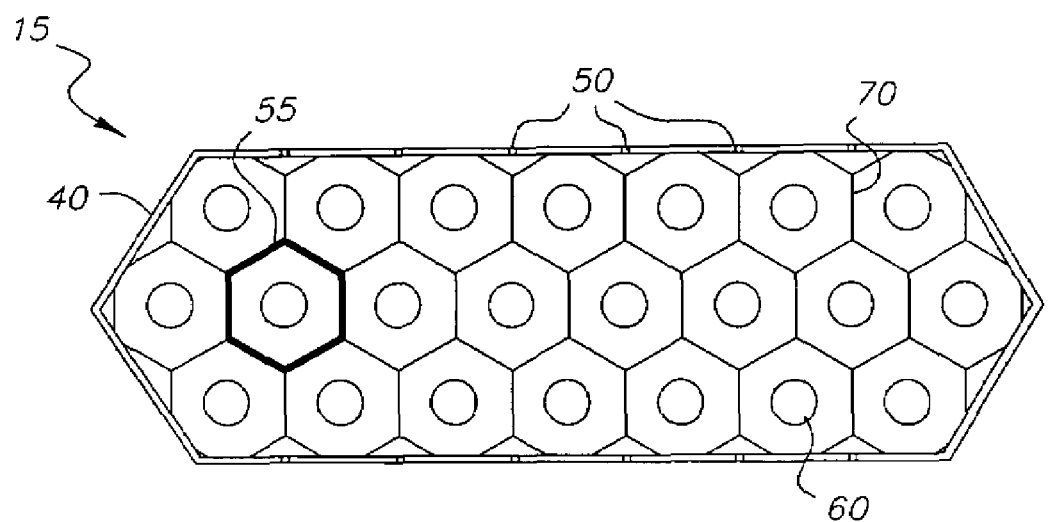
FIG. 5B illustrates packing in a rectangle.
Figure 5C:
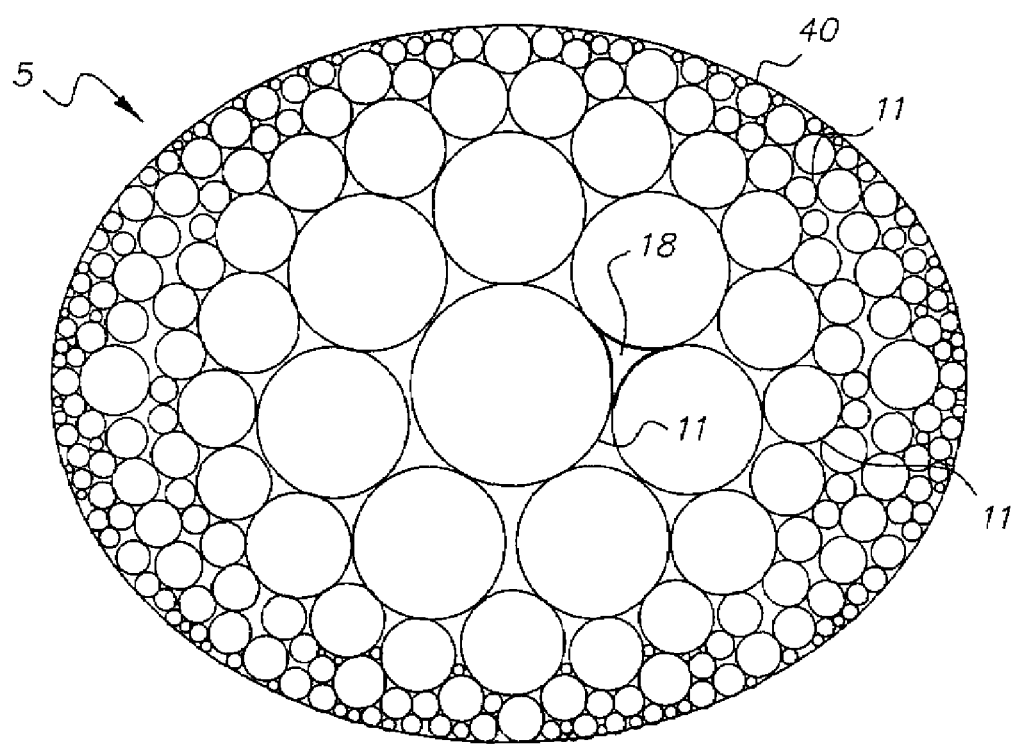
FIGS. 5C–5E illustrate that the blanks may have more than one ball size and the blanks may have curved boundaries.

In FIG. 5C, a densely-packed array of hollow glass balls 11 is characterized by small triangular gaps 18. This region is bounded by the hollow glass ball tangent points. Due to the manufacturing tolerance of the hollow glass balls 11, they may not be exactly tangent to one another. This triangular gap 18 is eliminated during the inflation process as the hollow glass balls 11 inflate.

As shown in FIG. 6A, the hollow glass balls 10 typically contain some gas 140, such as air. All the hollow glass balls 10 are equal in diameter so that they may be fabricated in quantity. The hollow glass balls 10 deviate from exact spheres, because of existing protrusions where they have been sealed. The protrusions are tip-offs 120 and occur during the fabrication process. The tip-offs 120 are unwanted since they provide no benefit, however, they can be oriented in the array such that they all point in the same direction and fill triangular gap 18 (shown in FIG. 5D). FIG. 6A shows a cross-section of a hollow glass ball 10 with tip-off 120. FIG. 6B shows a cross-section of a hollow glass ball 10 with a flat spot 130. The tip-offs 120 or flat spots 130 are positioned so that when aligned, they begin to fill a void between each of the packed hollow glass balls 10. This orientation will minimize surface irregularities on the back face sheet 20. The hollow glass balls 10 are nominally 0.48 millimeters thick for a lightweight mirror blank.

Figure 2:
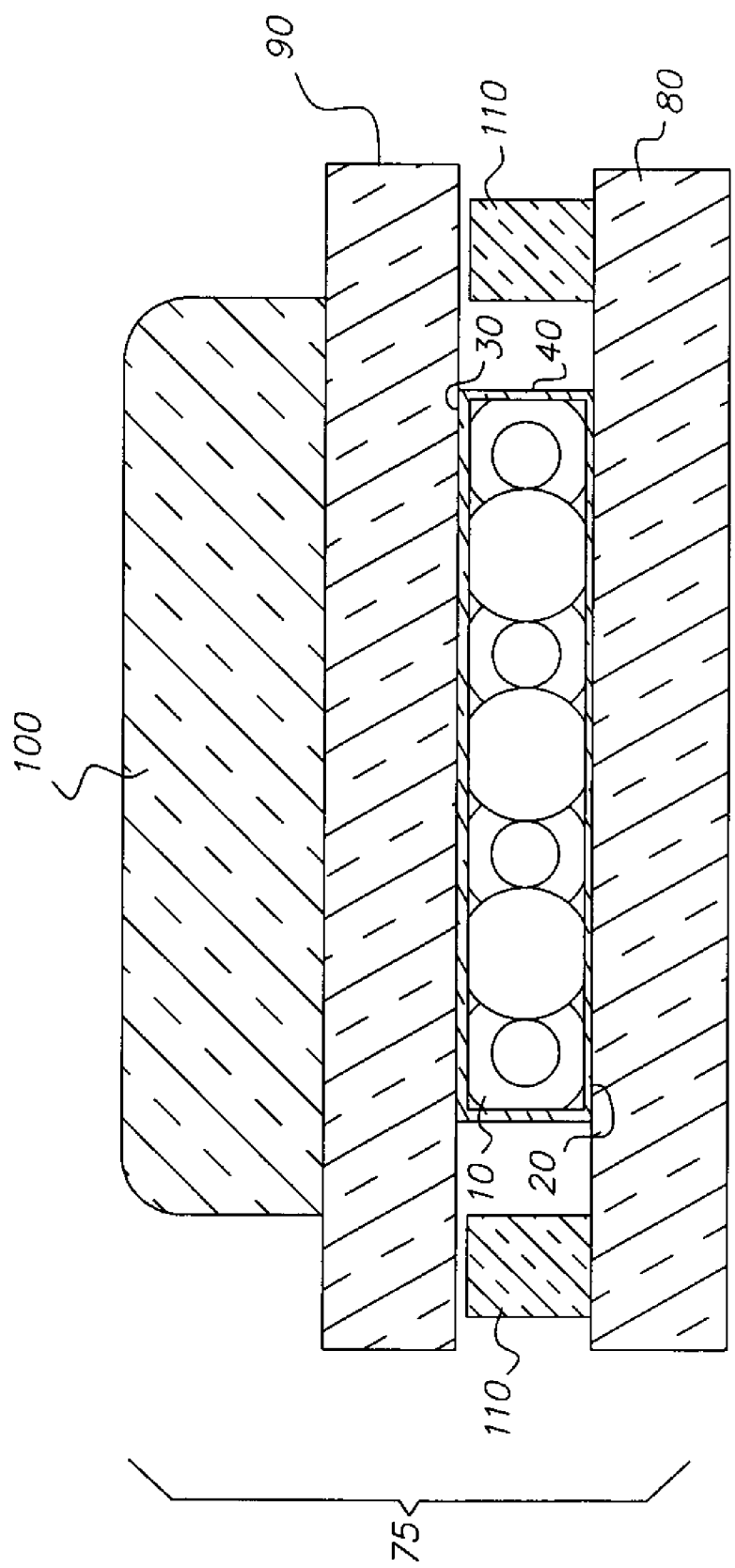
FIG. 2 shows a possible configuration in which the blank can be inflated while being constrained in the desired dimensions.
Figure 3:
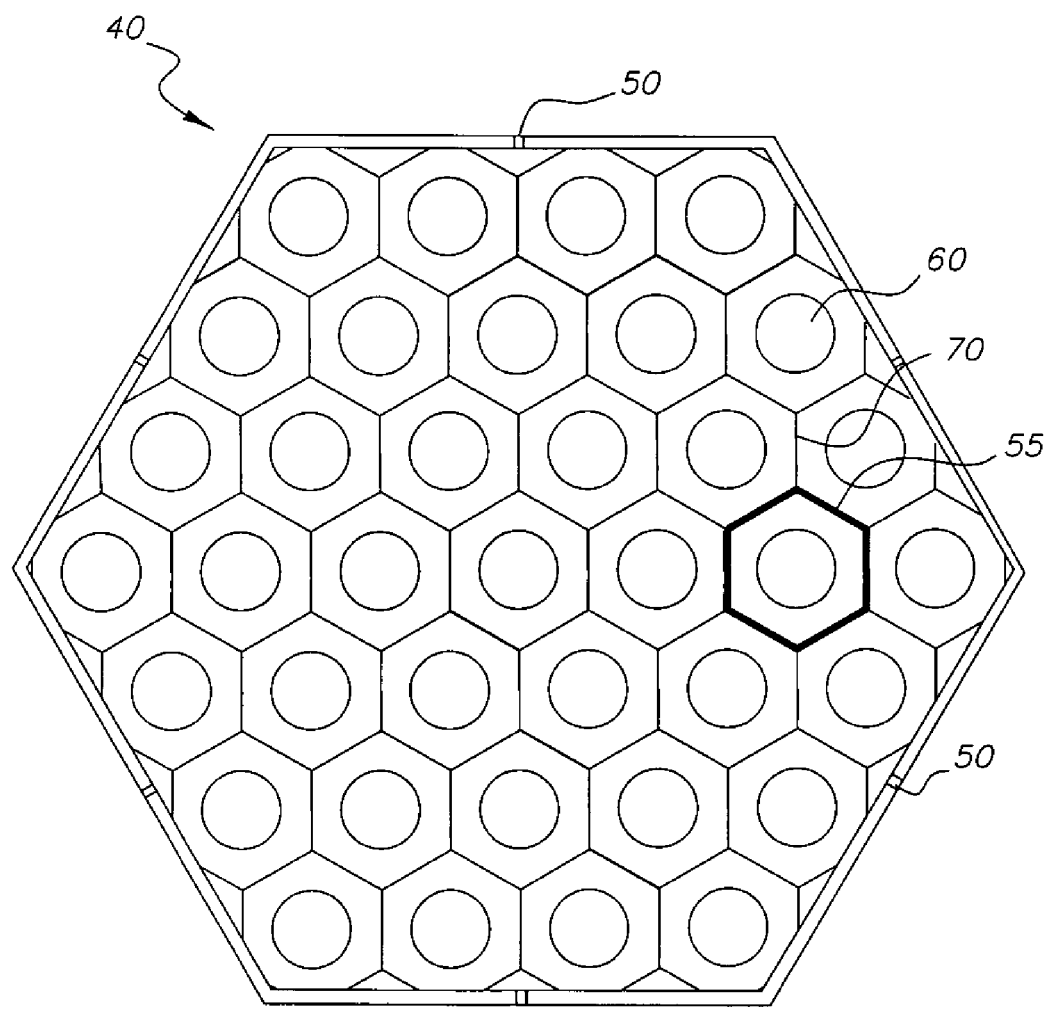
FIG. 3 is a top view of a mirror blank after the balls have been inflated and fused. The fused areas are shown with circular patches and the balls tend to press out into a hexagonal close pack orientation.

Referring to FIGS. 1 and 3, to enable the hollow glass balls 10 to stay in the close-pack orientation, an edge glass 40 is bent into a hexagonal ring. The edge glass 40 can be omitted; however, a refractory 80 or 90 should, preferably, contain and constrain the hollow glass balls 10 from the sides. The edge glass 40 or alternative refractory 80, 90 restricts the hollow glass balls 10 expansion when heat is applied. The hollow glass balls 10 first soften and then expand into each other as well as the other bounding glass structures (edge glass 40, refractories 80 or 90). In FIG. 1, vent holes 50 in the edge glass 40 allow trapped air to escape during the inflation process. The vent holes 50 are located near the top and bottom of the edge glass 40 so that they do not become blocked during the inflation process. The edge glass 40 should be taller than the hollow glass balls 10 to ensure a good fusion to front face sheet 20 and back face sheet 30. Additionally, the edge glass's 40 faying surfaces should be polished to improve fusion to the front and back face sheets, 20 and 30, respectively. In preparation for inflation, the mirror blank assembly 75 in FIG. 2 is constructed such that the back face sheet 30 is constrained with a refractory 90 and an additional mass 100. The face sheets 20, 30 should not stick to the refractories 80 or 90. Many different materials are possible for the refractories 80 or 90. Graphite, alumina, ceramics, and silicon carbide are reasonable choices.

The total mass of refractory 90 and the additional mass 100 must counter the forces from the inflating hollow glass balls 10. The forces from the hollow glass balls 10 are calculated by knowing the temperature, pressure, and volumes for the hollow glass balls 10, before and after heating, and by applying the Universal Gas Law.

The hollow glass balls 10 contain air, but alternatively could be sealed with other gases such as nitrogen or argon. The pressure inside the hollow glass balls 10 is referred to as the internal pressure. The pressure difference inside the hollow glass balls 10 and external to the hollow glass balls 10 can be regulated in a number of ways; most directly, a pressure difference between the internal and external pressure can be generated with a pressure vessel. To prevent the mirror blank assembly 75 from being crushed and to make the magnitude of the additional mass 100 less critical, stand-offs 110 are added to engage the refractory 90, if the back face sheet 30 moves too far.

In FIG. 2, a bottom refractory 80 supports the front face sheet 20. While both face refractories 80 and 90 in the figure are plano, those skilled in the art of glass slumping will be quick to realize that a curved refractory, in place of either refractory 80 and 90 or both, would form curved face sheets. This would be extremely advantageous, since a mirror blank in near net-shape would greatly reduce the time required to fabricate such a curve. Ideally, refractories 80 and 90 would also constrain the sides of the mirror blank assembly 75 during the heating process as the forces press outward. Without such constraint some side bulging can occur.

In a pressure-controlled furnace (not shown), the hollow glass balls 10 are heated above their annealing temperature, but below their softening point. As the furnace temperature is increased, the pressure inside the furnace is increased, holding the volume of the hollow glass balls 10 constant. Inflation of the hollow glass balls 10 is controlled by reducing the ambient furnace pressure. At a desired pressure, the furnace temperature is reduced while the pressure is adjusted so the volumes are constant. The hollow glass balls 10 freeze in position once they cross the strain point. Further controlled cooling serves to anneal the mirror blank assembly 75, thereby reducing stress in the mirror blank.

One must be careful to anneal inflated glass mirror blank 15 (shown in FIG. 4) since several high re-entrant angles are a part of the mirror blank 15. Successful completion of grinding, polishing, and drilling operations require a stress-free mirror blank 15. The results from this process are shown in FIG. 3. The hollow glass balls 10 fuse to front face sheet 20 and back face sheet 30; consequently, forming approximately circular fusing regions 60. Each hollow glass ball 10 expands into a cell 55. The hollow glass balls 10 also fuse to each other forming hexagonal cell walls 70. Depending on the thickness of edge glass 40, the hollow glass balls 10 will also deform edge glass 40 if the edge glass 40 is not constrained.

Under a pressure-controlled furnace (not shown), the forces exert upon the hollow glass balls 10 by expanding according to the Universal Gas Law. These expansion forces may be controlled using the temperature at which the hollow glass balls 10 are sealed. The hollow glass balls 10 are still heated to a temperature above the annealing temperature and below their softening point. In general, when inflating spheres into hexagonal cells, if the cell height is equal to the ball diameter, the volume change between hexagon and sphere is 1.654. Since the starting and ending volumes are known, the ratio of sealing temperature to ending furnace temperature can be chosen to offset the volume change. In this way, the pressure in the ball at the new volume and elevated temperature can be adjusted.

In one exemplary description, as the hollow glass balls 10 are heated and the pressure inside them increases, the hollow glass balls 10 inflate, expanding to fill the spaces between each of the hollow glass balls 10. In one embodiment, a method for controlling the pressure on the hollow glass balls 10 is used. This stops the hollow glass balls 10 from over-expanding and starts the inflation part of the process in a controlled manner.

Because the hollow glass balls 10 are heated and sealed at a temperature higher than room temperature, they have a lower pressure difference with respect to the ambient furnace's pressure. As the temperature increases, the pressure inside the hollow glass ball 10 changes from essentially a vacuum to positive pressure. This effect on pressure can be used to control the inflation rate of the hollow glass balls 10.

Referring to FIGS. 2 and 3, fusion between hollow glass balls 10, face sheets 20, 30, and edge glass 40 occurs during the inflation step. All these components, being of the same material, fuse together. The hollow glass balls 10 tend toward hexagonal close-packed cells 55. The cells 55 can each have variable cell wall thickness or have essentially uniform wall thickness. Vent holes 50 through the edge glass 40 prevent pressure from building up inside the mirror blank assembly 75. A force on top of the back face sheet 30 causes the hollow glass balls 10 to expand toward the edge glass 40. The edge glass 40 constrains the hollow glass balls 10 and fuses with them. Once the fusion step is complete, a cooling step follows, slowly decreasing the temperature to the annealing temperature. The hollow glass balls 10, if pressure-controlled, can be kept at their inflated volumes. In the absence of direct pressure control, the hollow glass balls 10 remain inflated with minimal collapse, if the inflation temperature is not too far from the annealing temperature. The temperature at which this occurs is determined experimentally.

During its cooling cycle, the pressure inside the cells 55 will develop some vacuum relative to atmospheric pressure. Once cooled, the cells 55 are pierced to relieve the partial vacuum inside. The fused mirror blank assembly 75 is subsequently annealed and the vent holes 50 are fire polished to fuse any cracked sites. The cells 55 can be formed and frozen, if the peak furnace temperature is kept to a minimum. In FIG. 2, stand-offs 110 serve to support the upper refractory 90 and additional mass 100 so the mirror blank assembly 75 is not crushed during the heating and cooling cycles. The edge glass 40 will stretch, but if it is thick enough and the temperature is not far from the annealing point the edge glass 40 will constrain the mirror blank assembly 75.

Another way to control the expanding hollow glass ball forces is to seal the hollow glass balls 10 under partial vacuum. Then some initial heating is required to increase the internal ball pressure back to atmospheric pressure. The elevated temperature will result in a new elevated pressure until the pressure inside and outside of the hollow glass balls 10 becomes equal. Additional heating will increase the pressure inside the hollow glass balls 10 relative to the heating chamber. The viscosity at which the hollow glass balls 10 begin to fuse will then be lower.

Still another way to control the forces upon the hollow glass balls 10 is to seal the hollow glass balls 10 and then elevate their temperature until they expand to some greater volume. Then, cool the hollow glass balls 10 at this larger size. The pressure inside the hollow glass balls 10 will be at a partial vacuum, depending on the elevated temperature of the hollow glass balls 10.

Figure 4:
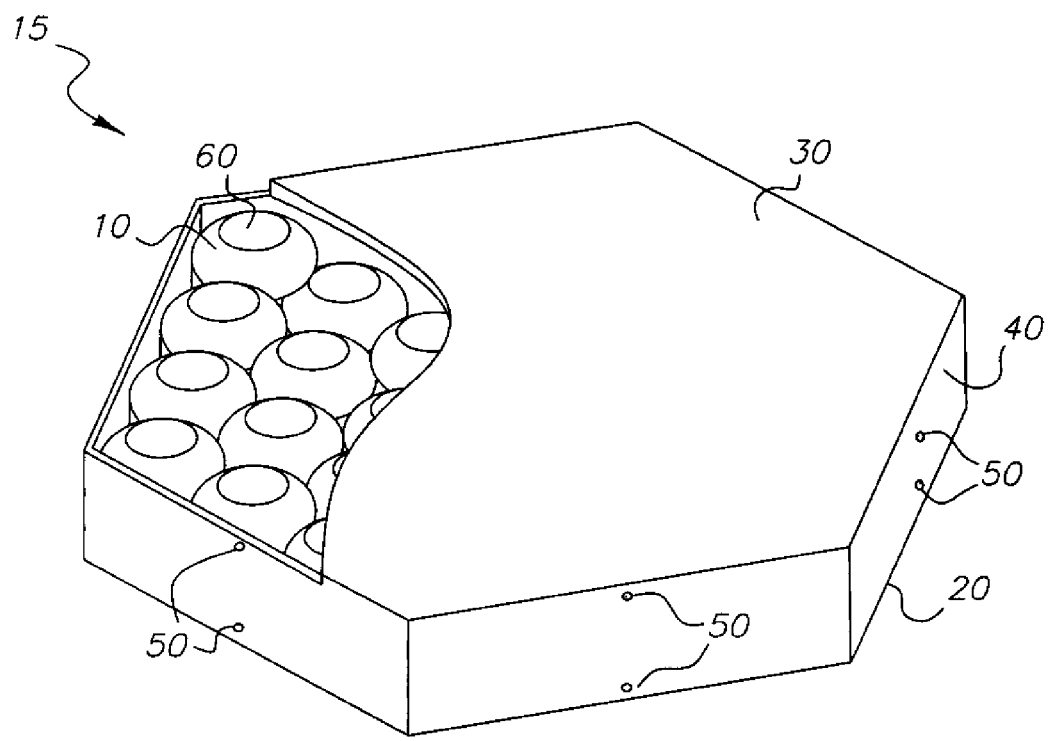
FIG. 4 is a perspective view of a mirror blank after the balls have been inflated and fused.

Referring to FIGS. 2–4, once the mirror blank 15 is formed, the partial pressure inside the balls 10 must be relieved. Changes in temperature and pressure will cause the cells 55 to exert forces on the front face sheet 20. If the cells 55 are vented to ambient pressure, these same forces vanish. The cells 55 may be vented through the back face sheet 30 and through the edge glass 40. Vent holes 50 should be large enough to remove processing debris. These vent holes 50 should be fire-polished during an annealing cycle to eliminate any crack sites from the venting process.

Successful methods of venting inflated mirror blanks 15 (shown in FIG. 4) include drilling and fire polishing, laser melting, and melting holes with a heated rod. The heated rod approach is useful for venting inflated mirror blanks 15 with multiple layers of hollow glass balls 10. Other methods of venting are also possible. Sandblasting has been used to make holes and chemical etching is also a viable technique. Abrasive water jet boring is possible, but extremely risky to the inflated mirror blank 15.

Following the venting process, the inflated mirror blank 15 should be annealed to relieve the stresses the partial pressure in the cells 55 exerted on the cell walls 70 and face sheets 20, 30. Temperatures should, preferably, be elevated very slowly to avoid cracking due to thermal stress and any crack sites initiated by the venting process. Also, uneven heating may cause thermal gradients and these should be minimized.

FIG. 4 shows the inflated glass mirror blank 15 in a cut-away view. The hollow glass balls 10 expand and deform against the face sheets 20, 30 to produce a fusion region 60. As the hollow glass balls 10 expand, the air between each of the hollow glass balls 10 is forced out through the vent holes 50 in edge glass 40.

FIG. 5A shows how the inflated glass mirror blank 15 was constructed from a front face sheet 20, a back face sheet 30, and an additional intermediate face sheet 25. Adding multiple layers stiffens hollow glass balls 10 in inflated glass mirror blank 15. The edge glass 40 still contains vent holes 50, but now the vent holes 50 accommodate multiple layers.

FIG. 5B shows that a hexagonal lattice can be formed in shapes other than hexagons. In this figure, the inflated glass mirror blank 15 approximates a rectangle. Other possible shapes for the inflated glass mirror blank 15 include polygons, sectors of circles, pyramids, toroids, parabolas, conic sections, and other irregular shapes.

Figure 5D:
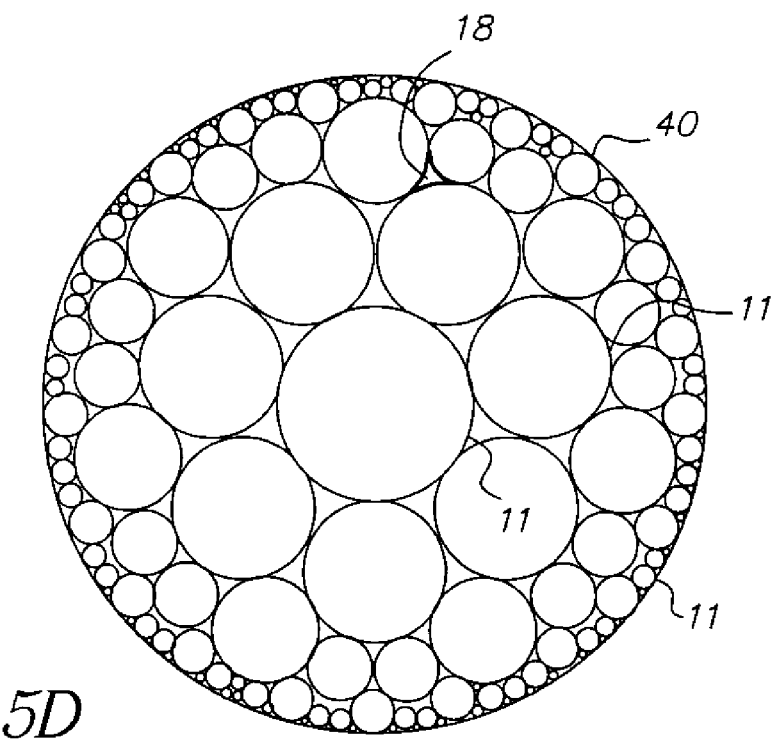
Figure 5E:
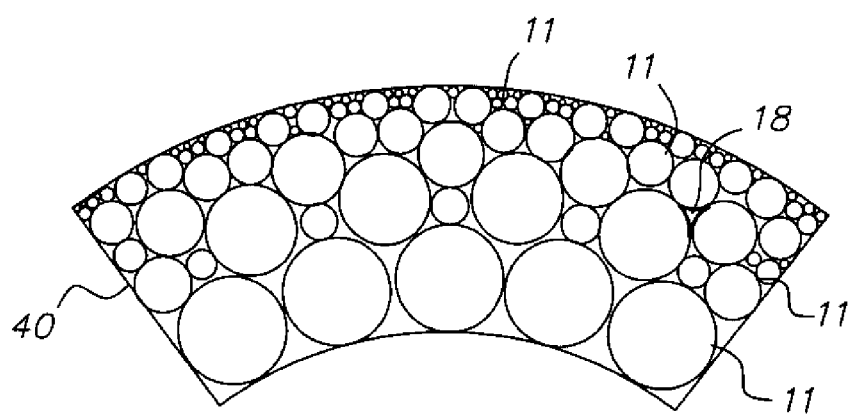

FIG. 5C shows an un-inflated glass mirror blank 5 consisting of hollow glass balls 11 having a plurality of different diameters. These hollow glass balls 11 are also thin shelled and may not be perfectly spherical, but are substantially so. The hollow glass balls 11, with a plurality of different diameters, are bounded with an elliptical edge glass 40. FIG. 5D shows the special case of a circular edge glass 40 having a symmetrical pattern. FIG. 5E shows how a petal-shaped mirror blank 5 may be constructed using the circle packin ideas described earlier. Other shapes, such as polygons, toroids, conic sections, and irregular closed curves are possible. The hollow glass balls 11 will expand to fill the voids.

When constructing the mirror blank 5, all the components must have the same thermal expansion coefficient. The easiest way to achieve this is to construct mirror blank 5 from the same type of material. Uniform construction of the mirror blank 5 ensures that thermal variations causing dimensional changes do not stress the components. Ideally, materials with extremely small coefficients of thermal expansion are used to minimize this effect. However, since all the components are chemically the same, loss in image quality from differential expansion of components is eliminated. Differential heating of space based mirrors is a common problem and the mirror must withstand uncompensated thermal gradients if it is to maintain image quality.

Venting the cells 55 can be achieved in several ways. Some methods are more attractive than others, depending on the application. Melting vent holes 50 with a thin, hot metal rod (not shown) is a way to vent a multi-layer mirror blank, as shown in FIG. 5A. The rods, being quite long, can span multiple layers. A laser, emitting radiation in the glass absorption band, can melt small holes. The process by which this is accomplished is sensitive to process variations. This process has been tried with success. The process is prone to pulling a small piece of glass into the cells 55 as the pressure is vented. Venting the mirror blank 15 by drilling holes with a core drill works well. Holes large enough to let cooling water escape the vented cell 55 are required. This process produces chipping, and fire polishing is needed to stop fractures. Still another method to vent the cells 55 is sand blasting. The sand blasting method would require the addition of a washing step to remove the sand from the cells 55. Using abrasive water-jets is another possible method to vent cells 55. These two approaches risk damaging the cells 55.

In the pre-inflated state, the hollow glass balls 10 are constrained vertically with face sheets 20 and 30, both refractories 80, 90, and additional mass 100, as shown in FIG. 2. The hollow glass balls 10 are constrained horizontally with edge glass 40. Upon heating the pre-inflated components past the glass annealing temperature, several changes happen. The edge glass 40 fuses to the front face sheet 20 and back face sheet 30. The hollow glass balls 10 expand to fill the gap between the back face sheet 30 and front face sheet 20. As this gap is being filled, the expanding hollow glass balls 10 also press into each other. The fully expanded hollow glass balls 10 fuse top and bottom to the back face sheet 30 and front face sheet 20. They also fuse to each other, resulting in cells 55 and cell walls 70. Cells 55 also fuse to the edge glass 40. Without vent holes 50 in edge glass 40, this expansion would not efficiently occur, because the fusion between the edge glass 40 and face sheets 20, 30 is sufficient to isolate the gas trapped between the face sheets 20, 30.

To achieve uniform cells 55, the process generating the hollow glass balls 10, needs to produce a ball with a consistent wall thickness, diameter, and shape. In addition to these dimensional requirements, the temperature at which the hollow glass balls 10 are sealed, should be held as constant as possible. Uniform heating will help inflate the hollow glass balls 10 at the same time generating forces in equilibrium. This will help ensure uniform cell 55 formation.

Given that extremely hot glass flows over time; a balance between the time spent in a furnace, the peak temperature, and temperature at which one seals the hollow glass balls 10, must be found. When the furnace is too hot, the glass flows too quickly and the vacuum generated pulls the glass in and away from the fusion sites. When the furnace is too cool, insufficient press-out is evident and the fusion sites are small. Through some experimentation, optimal operating ranges can be found. The following examples give the operating points for the materials selected.

EXAMPLE I

A small 7-ball mirror blank was constructed from soda-lime glass balls. The balls were 44.53 mm in diameter and had an average shell thickness of 0.27 mm. Circular face sheets 1.54 mm thick and 133.35 mm in diameter were fused to the balls at a peak furnace temperature of 615° C. for 2 hours. No edge glass was fused into the face sheets. A higher-temperature glass-ring with a refractory liner was used to contain the balls. The resulting mirror blank was 9.71 kg/m$^2$.

EXAMPLE II

A 279.4 mm point-to-point regular-hexagonal mirror-blank was made from borosilicate glass. This blank used 91 balls with a 25.4 mm diameter. The balls were sealed at 315° C. Hexagonal face sheets 1.14 mm thick were fused front and back and an edge glass was also used. The assembly was heated to a peak temperature of 730° C. over a 5-hour period. The resulting mirror blank was 12.45 kg/m$^2$.

Several variations and modifications to the mirror blank fabrication process in Example II are possible. In making large diameter mirror blanks, the ratio of the mirror's diameter to the mirror blank's thickness is usually no larger than 10:1. Therefore, multiple layers of hollow glass balls 10 as depicted in FIG. 5A, could be used to increase the mirror stiffness.

For curved mirror blanks, the front face sheet 20, may be slumped against a curved refractory prior to assembly and contact with the hollow glass balls 10. FIG. 2 would change by adding a curve to the refractory 80. Depending on the curve, the back face sheet 30 could also be curved to match refractory 90. Alternatively, and depending on the steepness of the curve, the face sheets 20, 30 could be slumped and hollow glass balls 10 inflated during the same operation. The former approach ensures good fusion with edge glass 40. Modifications to edge glass 40 are needed to ensure a good contact to face sheets 20, 30.

The inflated glass mirror blank 15 could be made with oversized face sheets 20, 30 extending past the edge glass 40. Extending the face sheets 20, 30 past the edge glass 40 aids a small-tool grinding or polishing process step, as the edge effects can be removed when the face sheets 20, 30 are trimmed back to edge glass 40.

The invention has been described with reference to one or more embodiments; however, it will be appreciated that variations and modifications can be effected by a person of ordinary skill in the art without departing from the scope of the invention. Some examples of such variations are shown in FIGS. 5A–5E.

PARTS LIST 5. pre-inflated glass mirror blank
10. hollow glass balls
11. hollow glass balls
15. inflated glass mirror blank
18. triangular gap
20. front face sheet
25. intermediate face sheet
30. back face sheet
40. edge glass
50. vent holes
55. cell
60. fusion regions
70. hexagonal cell walls
75. mirror blank assembly
80. refractory
90. refractory
100. additional mass
110. stand-off
120. tip-off
130. flat spot
140. Gas

What is claimed is:

1. A method for constructing a mirror blank assembly, comprising the steps of:
    a) arranging hollow, sealed glass balls, on a front face sheet, and in close proximity to each other to permit fusing upon expansion, the hollow, sealed glass balls having a fixed, initial internal pressure;
    b) restricting the expansion of the glass balls with a bounding structure during expansion of the glass balls to force the glass balls into a densely packed array of cells;
    c) applying heat to soften the glass balls and increase pressure within the glass balls as the glass balls fuse with each other during expansion, forming cells, wherein as a result of fusing, the glass balls contact the front face sheet as a result of the increased pressure within the glass balls;
    d) annealing and cooling the mirror blank assembly to below annealing temperature associated with the glass balls;
    e) venting the cells to equalize internal and external pressure applied to the front face sheet; and
    f) keeping the cells vented in the mirror blank assembly.

2. The method claimed in claim 1, wherein arranging the glass balls includes the step of:
    a1) placing the glass balls into multiple layers to contact the front face sheet and improve stiffness of the mirror blank assembly after fusing.

3. The method claimed in claim 1, wherein the glass balls include a plurality of sizes and shapes selected for arranging on the front face sheet in an ordered array.

4. The method claimed in claim 3, wherein arranging the glass balls includes the step of: a1) densely packing the glass balls in a hexagonal lattice.

5. The method claimed in claim 3, wherein arranging the glass balls includes the step of: a1) densely packing the glass balls in a circular ring.

6. The method claimed in claim 3, wherein arranging the glass balls includes the step of: a1) densely packing the glass balls in a ring.

7. The method claimed in claim 1, wherein constructing the mirror blank assembly further includes the step of:
forming the mirror blank assembly into a predetermined geometric shape for containing the glass balls.

8. The method claimed in claim 7, wherein the predetermined geometric shape is chosen from the group of polygons, sectors of circles, pyramids, toroids, parabolic, and conic sections.

9. The method claimed in claim 1, wherein venting the cells includes the step of
melting vent holes in the cells with a laser.

10. The method claimed in claim 1, wherein venting the cells includes the step of
drilling vent holes in the cells.

11. The method claimed in claim 1, wherein venting the cells includes the step of
melting vent holes in the cells with a heated rod.

12. The method claimed in claim 1, wherein venting the cells includes the step of
sandblasting a small area of the cells.

13. The method claimed in claim 1, wherein venting the cells includes the step of employing abrasive water-jetting.

14. A method for manufacturing an assembly including hollows, sealed glass balls for use in constructing a mirror blank, comprising the steps of:
a) arranging the hollow, sealed glass balls in close proximity to each other in between a front face sheet and a back face sheet to permit fusing upon expansion;
b) surrounding the glass balls with a vented edge glass;
c) fixing an initial internal pressure within the glass balls;
d) applying heat to soften the glass balls and increase pressure within the glass balls as the glass balls fuse with each other during expansion, forming cells, wherein as a result of fusing, the glass balls contact the front face sheet as a result of the increased pressure within the glass balls;
e) restricting the expansion of the glass balls to force the glass balls into a densely packed array of cells;
f) annealing and cooling the mirror blank to ambient temperature;
g) venting the cells to equalize internal and external pressure on the front and the back face sheets; and
h) keeping the cells vented in the assembly.

15. The method claimed in claim 14, wherein fixing the initial internal pressure of the glass balls includes the step of:
c1) sealing the glass balls at an elevated temperature to control the initial internal pressure within the cells.

16. The method claimed in claim 14, wherein fixing the initial internal pressure of the glass balls includes the step of:
c1) sealing the glass balls within a partial vacuum with respect to the external pressure to control the initial internal pressure within the cells.

17. The method claimed in claim 14, wherein fixing the initial internal pressure of the glass balls includes the step of:
c1) sealing the glass balls and cycling at an elevated temperature such that the glass balls expand, and upon cooling, the glass balls have a partial vacuum within.

18. The method claimed in claim 14, wherein venting the cells includes the step of melting vent holes in the cells with a laser.

19. The method claimed in claim 14, wherein venting the cells includes the step of drilling vent holes in the cells.

20. The method claimed in claim 14, wherein venting the cells includes the step of melting vent holes in the cells with a heated rod.

21. The method claimed in claim 14, wherein venting the cells includes the step of sandblasting a small area of the cells.

22. The method claimed in claim 14, wherein venting the cells includes the step of employing abrasive water-jetting.

23. The method claimed in claim 14, wherein venting the cells includes the step of chemically etching a small area of the cells.

24. The method claimed in claim 1, wherein the bounding structure has a curved surface.

25. The method claimed in claim 14, wherein the vented edge glass has a curved surface.

26. The method claimed in claim 24, wherein the front face sheet is heated and slumped against a curved surface of the bounding structure prior to being contacted by the glass balls.

27. The method claimed in claim 14, wherein the front face sheet is heated and slumped against a curved surface of the vented edge glass prior to being contacted by the glass balls.

* * * * *